Sept. 17, 1957 V. L. ANDREW 2,806,386
PUMP CASING WITH INTERCOMMUNICATING GEAR ENCLOSING CHAMBERS
Filed April 4, 1955
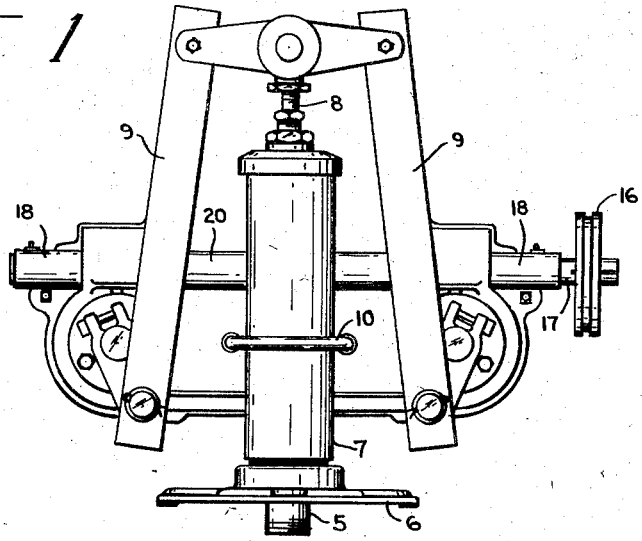
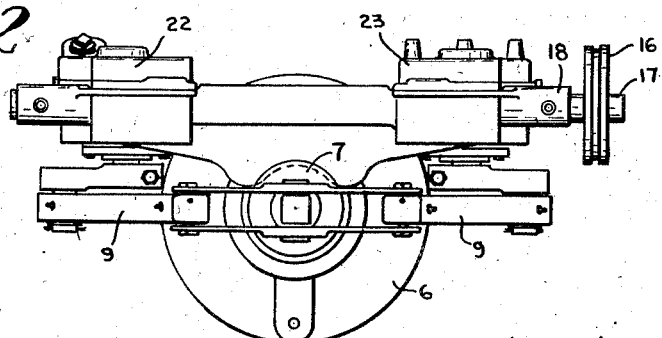
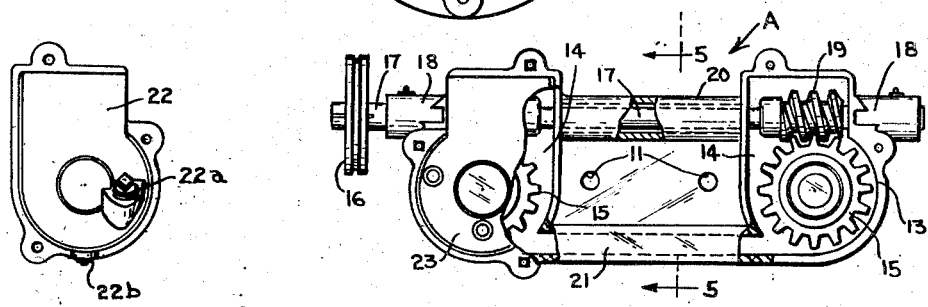
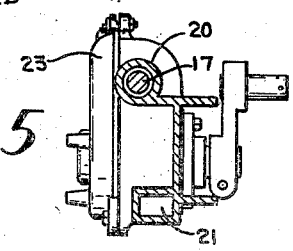
INVENTOR.
VAUGHAN L. ANDREW
BY
Williamson, Schroeder, Adams & Meyers
ATTORNEY

United States Patent Office

2,806,386
Patented Sept. 17, 1957

2,806,386

PUMP CASING WITH INTERCOMMUNICATING GEAR ENCLOSING CHAMBERS

Vaughan L. Andrew, Superior, Wis.

Application April 4, 1955, Serial No. 498,870

5 Claims. (Cl. 74—724)

This invention relates generally to pump gear enclosing casings and particularly to a casing constructed to afford lubricant communication between the gear enclosing chambers defined thereby.

This invention is an improvement on the prior invention disclosed and claimed in Patents No. 1,501,221 and No. 1,612,196, issued to Charles Kuechler wherein a generally similar pump actuating mechanism is disclosed. One of the problems of the Kuechler structures is that of maintaining a lubricant within the gear casings both of which disclose entirely separate and individual chambers surrounding each gear mechanism which do not communicate one with the other. This presents a problem in the maintenance thereof, since both chambers must obviously be individually checked whenever the pump is to be lubricated at the time intervals prescribed by the manufacturer. Very frequently the maintenance man in charge of this operation checks only one chamber and does not bother to check the other. Also in many installations only one of the chambers is readily accessible for inspection and filling. Obviously such gear mechanisms as are disclosed for actuating the pump do require constant lubrication to prevent damage to the parts thereof and many of the individual gear assemblies have been irreparably damaged due to lack of lubrication even though the companion gear assembly has been properly lubricated.

It is an object of my present invention to provide a relatively simple yet novel and highly efficient gear casing construction which will permit both gear chambers to be lubricated by a single filler opening disposed in some convenient location and communicating therewith.

More specifically it is an object to provide a pair of gear enclosing chambers with an intercommunication passage extending between the lower portions thereof so that the lubricant in the two chambers will be maintained at the same level.

These and other objects and advantages of my invention will more fully appear from the following description made in connection with the accompanying drawings wherein like reference characters refer to the same or similar parts throughout the several views, and in which:

Fig. 1 is a front elevational view of a pump assembly showing my new casing mounted thereon;

Fig. 2 is a top plan view thereof;

Fig. 3 is a rear elevational view of the gear casing, per se, with the cover plates removed and portions thereof broken away;

Fig. 4 is an outside elevational view of a cover plate with a filler opening therein; and Fig. 5 is a vertical sectional view taken substantially along the line 5—5 of Fig. 3 with the pulley wheel removed.

As shown in the accompanying drawings I provide a conventional well unit having a well pipe 5, a supporting flange plate 6, a reciprocating rod housing 7 and a reciprocating rod 8 with a pair of symmetrically arranged actuating pitmans 9 connected therewith in the usual manner.

A gear casing or housing designated as an entirety by the letter A is connected to the well housing 7 as by a U-bolt 10 extending through a pair of mounting apertures 11 formed in the connection web 12 of the housing A. In the form shown said housing or casing is constructed substantially entirely of a single casting wherein the mounting web 12 rigidly interconnects a pair of chamber defining gear casing portions 13 which respectively define a pair of gear enclosing chambers 14 within which a pair of driven gears 15 are respectively journaled for rotation. Said gears 15 are respectively fixed to a pair of stub shafts 15a which extend through the rear portions of the casting in sealed bearings to prevent leakage of the lubricant from the chambers. Said shafts have crank arms 15b fixed to the rear ends thereof and said crank arms are pin connected to the lower ends of the actuating pitmans 9 as best shown in Fig. 1.

These gears 15 are driven by any suitable source of rotary power such as an electric motor (not shown) which is connected by a belt and pulley drive to the pulley wheel 16. A drive shaft 17 is journaled in suitable bearings mounted in end bosses 18 of the upper portion of the housing A. The shaft 17 has a pair of worm gears 19 in driving connection therewith and respectively disposed in the upper portions of the two gear chambers 14 as best shown in Fig. 3. These worm gears 19 are connected to the shaft 17 by any suitable means such as by set screws (not shown). The intermediate portion of shaft 17 between gears 19 extends through a hollow integrally formed portion of casing A which provides a generally tubular shaft housing element 20 which sealingly interconnects the upper portions of gear chambers 14. While the bearings for shaft 17 mounted in bosses 18 must, of course, have suitable oil seals, no other oil seals are necessary around said shaft, since the entire enclosure is completely sealed from the air when assembled. The bottom portion of the two chambers 14 is interconnected by a communication passage 21 which is also integrally cast with the casing A. A pair of covers 22 and 23 are provided for enclosing said chambers 14 and at least one of these covers is provided with a filler opening such as the cover 22 illustrated in Fig. 4 having a filler opening with a filler plug 22a shown therein. A suitable drain plug 22b may be provided in the bottom of the cover 22.

It should be noted that the lower intercommunication passage 21 serves numerous functions and provides a number of very important advantages over the prior art structures previously identified therein. The capacity of the oil reservoir available for each separate gear mechanism is more than doubled in view of the capacity of the passage 21 in addition to the capacity of the two gear chambers themselves. By sealingly interconnecting the upper portions of the chambers 14 by shaft housing 20 which is materially larger than the shaft 17, air pressure within said chambers is always equalized so that the oil displaced by the gears 15 can return to the same level within the two chambers 14. As long as there is sufficient oil in one of said chambers to properly lubricate the gears therein, proper lubrication of the gears in the other chamber is also insured. The lubricant can be put in at the factory, since a completely sealed unit is provided. This prevents the use of improper lubricant during initial operation of the pump and also prevents inadvertent neglect on the part of the operator when the unit is being initially operated. It is also apparent that a single filler opening will permit inspection of the oil level which will be maintained equal in both chambers and addition of oil at one location will simultaneously supply oil to a predetermined level in both chambers.

It will be seen that I have provided a relatively simple yet highly efficient improvement in gear casings and housings for pump operating mechanisms which materially reduces the chance of improper lubrication in the two gear chambers.

It will, of course, be understood that various changes may be made in the form, details, arrangement, and proportions of the parts without departing from the scope of my invention which generally stated consists in the matter set forth in the appended claims.

What is claimed is:

1. A gear mounting and enclosing casing for pumps comprising an integrally cast unit constructed and arranged to form a pair of separate spaced apart gear-enclosing chambers with means defining a hollow shaft surrounding passage affording communication between the upper portions of said chambers, means defining a hollow intercommunication passage interconnecting the lower portions of said chambers, a drive shaft extending through the upper portions of said chambers with an interconnection portion extending through said upper passage, sealing means spaced outwardly from said shaft surrounding passage and providing fluid tight seals adjacent said drive shaft and positioned to prevent external leakage from the outer portions of said chambers, a pair of rotary driven gear elements respectively journaled in said chambers and having driving connection with said shaft to be driven thereby, removable cover means closing said two chambers to sealingly enclose said gears therewithin, and filler means permitting at least one of said chambers to be filled with lubricant to a predetermined level.

2. The structure set forth in claim 1 and a pair of driven shafts fixed to said gears with sealing means mounted in said casing for surrounding said shafts to maintain fluid tight chambers and a completely sealed pump actuating mechanism.

3. A gear mounting and enclosing casing for pumps comprising an integrally cast unit constructed and arranged to form a pair of spaced apart individual gear enclosing chambers, said integrally cast unit including means defining a hollow intercommunication passage between the lower portions of said chambers to afford lubricant communication therebetween, intercommunication means between the upper portions of said chambers to equalize the pressure therebetween, a rotary drive shaft extending through the upper portions of said chambers with means adjacent the same to prevent leakage of lubricant outside of said chambers, a pair of rotary driven gears respectively journaled in said chambers and having driving connection with said shaft, cover means enclosing said gears to sealingly close said chambers, and filler means communicating with at least one of said chambers to permit the same to be filled with lubricant to a predetermined level.

4. A gear mounting and enclosing casing for pumps comprising means defining a pair of spaced apart gear enclosing chambers, a pair of gears respectively journaled therein, a drive shaft having driving connection with said gears for driving the same, means defining passages between the upper and lower portions of said chambers to equalize the pressure therebetween and afford liquid communication therebetween, means sealing said two interconnected chambers to prevent communication exterially thereof, and filler means communicating with at least one of said chambers to permit filling said interconnected chambers with lubricant to a predetermined level.

5. A gear mounting and enclosing casing for pumps comprising means defining a pair of gear enclosing chambers, means affording communication between the lower portions of said chambers to interconnect the same, pressure equalizing means in the upper portions of said chambers, cover means closing said chambers and filler means communicating with at least one of said chambers to permit filling said two chambers with lubricant to a predetermined level.

References Cited in the file of this patent

UNITED STATES PATENTS

| | | |
|---|---|---|
| 1,501,221 | Kuechler | July 15, 1924 |
| 1,533,626 | Wilson | Apr. 14, 1925 |
| 1,612,196 | Kuechler | Dec. 28, 1926 |

FOREIGN PATENTS

| | | |
|---|---|---|
| 1,005,282 | France | Dec. 19, 1951 |